Figure 1:
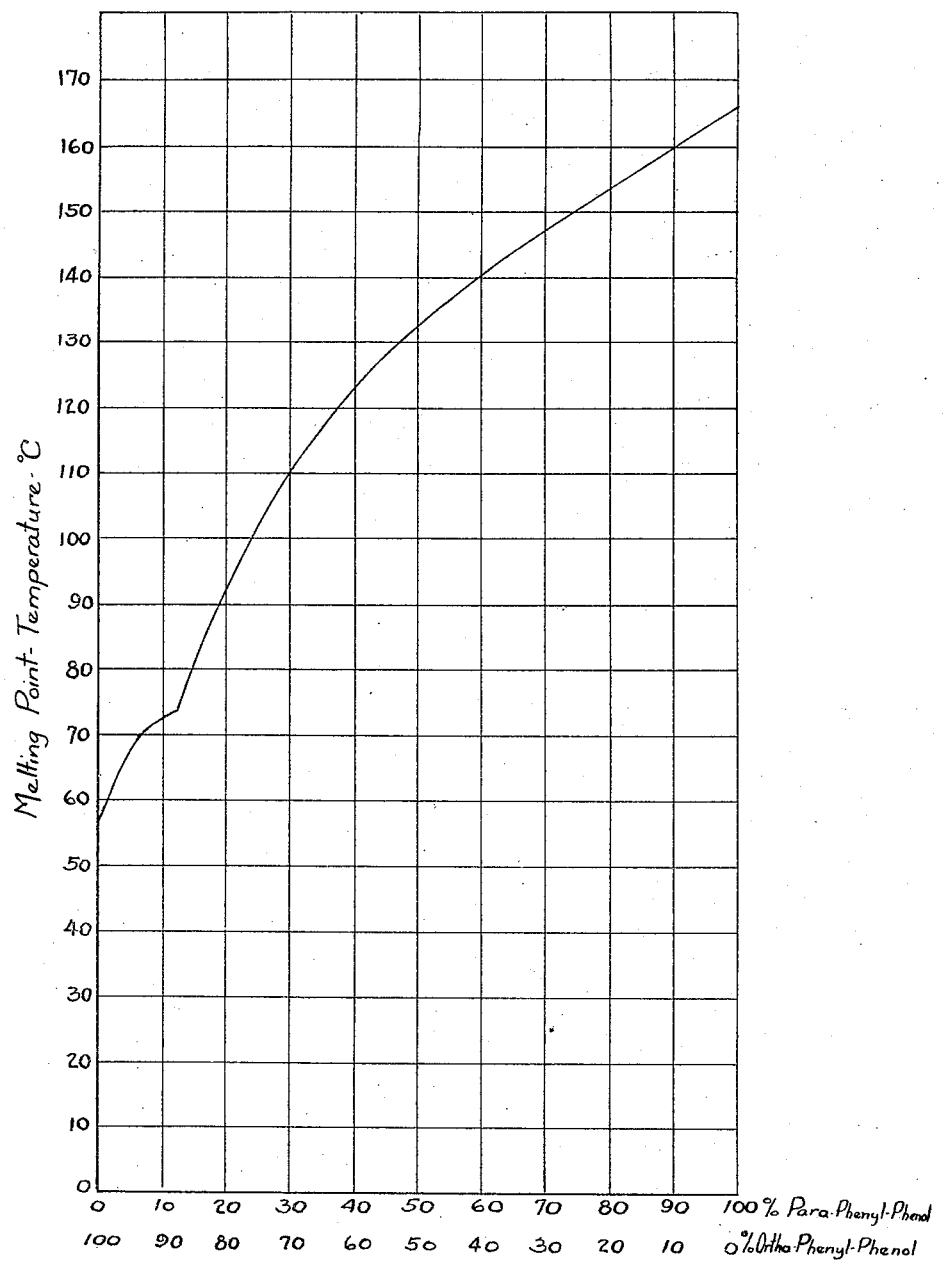

Patented Nov. 8, 1932

1,887,232

UNITED STATES PATENT OFFICE

GERALD H. COLEMAN, OF MIDLAND, MICHIGAN, ASSIGNOR TO THE DOW CHEMICAL COMPANY, OF MIDLAND, MICHIGAN, A CORPORATION OF MICHIGAN

METHOD OF SEPARATING ORTHO- AND PARA-PHENYLPHENOLS

Application filed December 5, 1929. Serial No. 411,716.

The present invention relates to the separation of phenylphenols, particularly to the separation and purification of ortho- and para-phenylphenols by crystallization thereof from mixed organic solvents.

The present method, which is adaptable to the separation of a mixture of phenylphenols, or to the purification of individual phenylphenols, is based on the fact that the phenylphenols are soluble in volatile mixed solvents to different degrees. For instance, when a mixture of ortho- and para-phenylphenols is dissolved in and then crystallized from such solvents, the para compound separates out first, then a mixture of the para and ortho forms, and then substantially pure ortho compound crystallizes out. My invention, then, consists of the improved method hereinafter fully described and particularly pointed out in the claims, the annexed drawing and the following description setting forth in detail several modes of carrying out my invention, such disclosed modes illustrating, however, but several of various ways in which the principle of my invention may be used.

In said annexed drawing:—

Fig. 1 is a chart giving a curve which shows the relationship between percentage composition of mixtures of ortho- and para-phenylphenols to the melting points thereof.

A mixture of ortho- and para-phenylphenols may be separated and purified by fractional crystallization from mixed volatile organic solvents, for example, by dissolving said mixture of phenylphenols in a suitable solvent in which the latter are relatively soluble, such as benzene, chlorobenzene, cyclohexane, tetralin, ether, ethyl acetate, chloroform, carbon tetrachloride, ethylene dichloride, acetic acid, or mixture thereof, preferably with the aid of heat, and then adding to the so-obtained solution a second solvent in which the phenylphenols, particularly the para-compound, are relatively less soluble and which is preferably miscible with the first solvent, such as an aliphatic hydrocarbon, e. g. petroleum ether, gasoline, or kerosene. The second solvent may be added hot, or the mixture may be heated after such addition to effect solution of the phenylphenols, in case, for example, that the addition of the second solvent has cooled the solution sufficiently to cause the formation of crystals. By varying the solvents used, the proportions thereof, and the temperature of the solution, it is possible to form crystals either immediately upon addition of the second solvent, after standing, after cooling, or by other treatment. Since the para compound is considerably less soluble in organic solvents than the corresponding ortho compound, the former crystallizes out first, the latter remaining in solution. Hence the process may be controlled so as to form, first, crystals of para-phenylphenol, then a mixture of the ortho and para forms which may be returned to the process, and then crystals of ortho compound.

Again, when for example, crude ortho-phenylphenol is purified by crystallization thereof from at least one of the above described solvents, there may be only a small amount of the corresponding para compound present, hence the first crystals to form may contain both ortho- and para-phenylphenols, followed by the separation of substantially pure ortho compound. Accordingly, the present method affords a useful means of separating and/or purifying phenylphenols.

The following examples typify ways in which the herein described method may be operated, and show ratios of the isomeric phenylphenols crystallized under certain conditions of temperature and proportions and amounts of solvents. The composition or purity of the phenylphenols employed in the examples or of the products obtained therein were ascertained by comparing the melting points thereof with the melting point curve shown in the annexed drawing.

Example 1

100 grams of crude ortho-phenylphenol (M. P. 58 to 60.5° C.), containing the corresponding para compound as an impurity, was dissolved in 50 cubic centimeters of benzene. The solution was diluted with 250 cubic centimeters of petroleum ether and allowed to stand over night at room temperature, whereupon 38 grams of crystals (M. P. 58 to 67° C.) were obtained. The filtrate from these crystals was cooled for two hours in ice, obtaining 42.5 grams of crystals melting at 57 to 57.5° C. The filtrate from the latter crystals was evaporated to about 20 cubic centimeters, diluted with about 25 cubic centimeters of petroleum ether and cooled to room temperature, thus securing an additional 16 grams of ortho-phenylphenol melting at 57.5 to 58° C.

Example 2

A mixture of ortho- and para-phenylphenols, having a melting point of 133° C., and containing 25 grams of each of the two isomers, was dissolved in 200 cubic centimeters of hot ethylene dichloride. 50 cubic centimeters of petroleum ether (boiling point 60 to 80° C.) was added to the hot solution which was then cooled to room temperature by standing. By such procedure, 22 grams of substantially pure para-phenylphenol (M. P. 166 to 167° C.) crystallized out. From the filtrate of the crystals there was obtained an additional 2 grams of the para compound (M. P. 166 to 166.5° C.) by adding thereto the washings of the first crop of crystals with 100 cubic centimeters petroleum ether. The filtrate, containing crude ortho-phenylphenol, was evaporated to about 25 cc. diluted with 50 cc. of petroleum ether, and cooled over night at room temperature, thereby obtaining 12 grams of crude ortho compound (M. P. 58.5° to 66° C.). The filtrate from the latter, on being cooled about 10° C. more, yielded 6 grams product (M. P. 57 to 58.5° C.). The residual liquid was further evaporated, diluted with petroleum ether and cooled, thereby obtaining an additional 7.5 grams of substantially pure ortho-phenylphenol (M. P. 57 to 58° C.).

Other mixtures of solvents, such as a mixture of benzene or other of the aforementioned equivalent compounds and petroleum ether, gasolene or kerosene, may be employed; also conditions, such as concentration and temperature, may be variously modified depending upon the relative proportions of phenylphenols present in the crude mixture, etc.

If desired, the procedure may be varied from that given above; for instance, after separation of the crystals containing the higher melting para-compound, the solution of ortho-compound may be distilled to remove, first, the solvent and then the ortho-compound, or the solvent may be distilled off, leaving the ortho-compound as a residue.

The herein described method is applicable to the separation of ortho- and para-phenylphenols, or to the purification of either of the two. Due to its higher melting point and lower solubility in organic solvents, the para-compound is more readily purified by the usual methods than is the ortho-compound. Hence, the present method particularly affords a useful means for the separation and/or purification of ortho-phenylphenol.

In the claims the expression "aliphatic hydrocarbon", is meant to refer to a hydrocarbon such as hexane, or octane, or a mixture of such hydrocarbons, such as the commercial materials, petroleum ether, gasolene, or kerosene.

Other modes of applying the principle of my invention may be employed instead of the one explained, change being made as regards the details herein disclosed, provided the step or steps stated by any of the following claims or the equivalent of such be employed.

I therefore particularly point out and distinctly claim as my invention:—

1. In a method of separating ortho- and para-phenylphenols from a mixture containing said compounds, the step which consists in crystallizing para-phenylphenol from a solution of the above mentioned phenylphenols in an admixture of an organic solvent selected from the group consisting of benzene, chlorobenzene, cyclohexane, tetrahydronaphthalene, ether, ethyl acetate, chloroform, carbon tetrachloride, ethylene dichloride, acetic acid, and mixtures thereof, with a liquid aliphatic hydrocarbon solvent.

2. In a method of separating ortho- and para-phenylphenols from a mixture containing said compounds, the steps which consist in crystallizing para-phenylphenol from a solution of the above mentioned phenylphenols in an admixture of an organic solvent selected from the group consisting of benzene, chlorobenzene, cyclohexane, tetrahydronaphthalene, ether, ethyl acetate, chloroform, carbon tetrachloride, ethylene dichloride, acetic acid, and mixtures thereof, with a liquid aliphatic hydrocarbon solvent, and recovering ortho-phenylphenol from the mother liquor.

3. In a method of separating ortho- and para-phenylphenols from a mixture containing said compounds, the steps which consist in dissolving the mixture of phenylphenols in an organic solvent selected from the group consisting of benzene, chlorobenzene, cyclohexane, tetrahydronaphthalene, ether, ethyl acetate, chloroform, carbon tetrachloride, ethylene dichloride, acetic acid, and mixtures thereof, then adding to the solution a liquid aliphatic hydrocarbon solvent, crystallizing and separating para-phenylphenol from the resulting solution, and recovering ortho-phenylphenol from the mother liquor.

4. In a method of purifying ortho-phenylphenol including the corresponding para-phenylphenol as an impurity, the step of crystallizing out para-phenylphenol from a benzene solution of the crude ortho-phenylphenol admixture with a liquid aliphatic hydrocarbon solvent.

5. In a method of separating ortho- and para-phenylphenols, the steps which consist of dissolving a mixture of the same in ethylene dichloride, adding thereto a liquid aliphatic hydrocarbon solvent, and fractionally crystallizing the phenylphenols therefrom.

Signed by me this 30 day of November, 1929.

GERALD H. COLEMAN.